US007936679B2

(12) United States Patent
Mui et al.

(10) Patent No.: US 7,936,679 B2
(45) Date of Patent: May 3, 2011

(54) METHOD AND APPARATUS FOR MANAGING XDSL PSEUDO LINKS

(75) Inventors: Alfred K. Mui, Fremont, CA (US); Christopher M. Chow, Redwood City, CA (US); Hojat Khelghati, San Jose, CA (US); Jalal O. Azim, Los Gatos, CA (US)

(73) Assignee: Ikanos Communications Inc., Fremont, CA (US)

( * ) Notice: Subject to any disclaimer, the term of this patent is extended or adjusted under 35 U.S.C. 154(b) by 73 days.

(21) Appl. No.: 12/322,097

(22) Filed: Jan. 29, 2009

(65) Prior Publication Data
US 2009/0190636 A1 Jul. 30, 2009

Related U.S. Application Data

(60) Provisional application No. 61/024,331, filed on Jan. 29, 2008.

(51) Int. Cl.
*G01R 31/08* (2006.01)
(52) U.S. Cl. .......................... 370/235; 370/201; 379/417
(58) Field of Classification Search .......... 370/200–253, 370/468, 334, 465, 235.1, 338; 375/222, 375/343, 267; 709/227; 379/417
See application file for complete search history.

(56) References Cited

U.S. PATENT DOCUMENTS

| 6,735,245 | B1 * | 5/2004 | Palm ............................. 375/222 |
| 6,870,834 | B1 * | 3/2005 | McHale et al. ............... 370/354 |
| 7,155,004 | B1 * | 12/2006 | Kennedy et al. ............. 379/327 |
| 7,305,216 | B2 | 12/2007 | Boos |
| 7,315,571 | B1 * | 1/2008 | Heidari et al. ................ 375/222 |
| 2009/0323788 | A1 * | 12/2009 | Gross et al. ................... 375/222 |

FOREIGN PATENT DOCUMENTS
EP 1283655 2/2003
* cited by examiner

*Primary Examiner* — Ricky Ngo
*Assistant Examiner* — Iqbal Zaidi
(74) *Attorney, Agent, or Firm* — IP Creators; Charles C Cary (57) ABSTRACT

A transceiver having shared and discrete components forming a transmit path and a receive path configured to couple to a subscriber line for establishing a communication channel with a remote transceiver. The transceiver comprises a pseudo link manager coupled between the transmit and receive path components to manage pseudo links on the subscriber line prior to entry into a session with the remote transceiver. The pseudo link manager includes: a line monitor and a disruptor. The line monitor monitors the subscriber line, prior to initiating a session, for a received communication signal indicative of a pre-existing session on the remote transceiver. The disruptor transmits a disruptor signal over the subscriber line to the remote transceiver responsive to the detection by the monitor of the received communication signal; thereby disrupting the remote transmitter's pre-existing session and allowing a new session to be established with the remote transceiver.

12 Claims, 5 Drawing Sheets

60 Pair Bundle

METHOD AND APPARATUS FOR MANAGING XDSL PSEUDO LINKS

CROSS REFERENCE TO RELATED APPLICATION

This application claims the benefit of prior filed co-pending Provisional Application No. 61/024,331 filed on Jan. 29, 2008 entitled "Method and Apparatus for Correcting the xDSL synch-up Condition over the Cross-Talk of the Twisted-Pairs" which is incorporated herein by reference in its entirety as if fully set forth herein.

BACKGROUND OF THE INVENTION

1. Field of Invention

The field of the present invention relates to multi-tone transceivers.

2. Description of the Related Art

Digital Subscriber Lines (DSL) technology and improvements thereon including: G.Lite, ADSL, $ADSL_2$, $ADSL_{2+}$, $VDSL_1$, $VDSL_2$, HDSL all of which are broadly identified as X-DSL have been developed to increase the effective bandwidth of existing subscriber line connections to high speed back bone networks developed by telecommunications companies. An X-DSL modem operates at frequencies higher than the voice band frequencies, thus an X-DSL modem may operate simultaneously with a voice band modem or a telephone conversation.

Each new XDSL protocol raises the bandwidth requirements of subscriber lines. As the bandwidth requirements increase so too does the complexity of the modem components. Additionally, because of the enormous variation in loop loss in the individual subscriber lines to which the modem may be coupled the individual components of the modem transmit and receive path must be reconfigurable to match the available bandwidth on a selected subscriber line.

Typically the central office (CO) of the telephone company includes racks of line cards each servicing many subscriber lines. Each line card includes many chips handling the digital and analog portions of the various XDSL communications over the subscriber lines. Each communication channel modulated onto a corresponding one of the digital subscriber lines is subject to crosstalk from communications channels modulated onto remaining ones of the digital subscriber lines in a bundle. This crosstalk degrades the performance of each digital subscriber line in a bundle of subscriber lines and in the extreme may render a given subscriber line connection inoperable.

What is needed is a modem with improved capabilities for responding to varying crosstalk levels in bundled digital subscriber lines.

SUMMARY OF THE INVENTION

A method and apparatus for management of XDSL pseudo links is disclosed. In an embodiment of the invention a transceiver having shared and discrete components forming a transmit path and a receive path configured to couple to a subscriber line for establishing a communication channel with a remote transceiver is disclosed. The transceiver comprises a pseudo link manager. The pseudo link manager is coupled between the transmit and receive path components to manage pseudo links on the subscriber line prior to entry into a session with the remote transceiver. The pseudo link manager includes: a line monitor and a disruptor. The line monitor monitors the subscriber line, prior to initiating a session, for a received communication signal indicative of a pre-existing session on the remote transceiver. The disrupter transmits a disrupter signal over the subscriber line to the remote transceiver responsive to the detection by the monitor of the received communication signal; thereby disrupting the remote transmitter's pre-existing session and allowing a new session to be established with the remote transceiver.

In an alternate embodiment of the invention a communication system comprising a plurality of transceivers each coupled to a corresponding one of a plurality of subscriber lines is disclosed. A selected one of the plurality of transceivers is coupled to the corresponding one of the plurality of subscriber lines for establishing a communication channel with a remote transceiver. The selected one of the plurality of transceivers includes a pseudo link manager. The pseudo link manager is coupled between the transmit and receive path components to manage pseudo links on the corresponding one of the plurality of subscriber lines prior to entry into a session with the remote transceiver. The pseudo link manager includes a line monitor and a disrupter. The line monitor monitors the corresponding one of the plurality of subscriber lines prior to the onset of a session for a received communication signal indicative of a pre-existing session between the remote transceiver and another one of the plurality of transceivers. The disruptor transmits a disruptor signal over the corresponding one of the plurality of subscriber lines responsive to the detection by the monitor of the received communication signal; thereby disrupting the remote transceiver's pre-existing session and allowing a new session to be established between the selected one of the plurality of transceivers and the remote transceiver.

Related means and methods are also disclosed.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

A method and apparatus is disclosed for crosstalk channel estimation among a plurality of digital subscriber lines each supporting multi-tone modulation of communications channels thereon. The line cards may be found in a central office, remote access terminal, business or home. The line cards may be coupled directly or indirectly to digital subscriber lines via one or more optical or wireless links. The line cards support communication channels with differing degrees of robustness for multi-tone protocols including: asymmetric digital subscriber line (ADSL); very high bit rate digital subscriber line (VDSL) and other orthogonal frequency division multiplexing (OFDM) plans including but not limited to the following:

TABLE 1

| Standard name | Common name | Downstream rate | Upstream rate |
|---|---|---|---|
| ANSI T1.413-1998 Issue 2 | ADSL | 8 Mbit/s | 1.0 Mbit/s |
| ITU G.992.1 | ADSL (G.DMT) | 8 Mbit/s | 1.0 Mbit/s |
| ITU G.992.1 Annex A | ADSL over POTS | 8 Mbit/s | 1.0 MBit/s |
| ITU G.992.1 Annex B | ADSL over ISDN | 8 Mbit/s | 1.0 MBit/s |
| ITU G.992.2 | ADSL Lite (G.Lite) | 1.5 Mbit/s | 0.5 Mbit/s |
| ITU G.992.3/4 | ADSL2 | 12 Mbit/s | 1.0 Mbit/s |
| ITU G.992.3/4 Annex J | ADSL2 | 12 Mbit/s | 3.5 Mbit/s |
| ITU G.992.3/4 Annex L | RE-ADSL2 | 5 Mbit/s | 0.8 Mbit/s |
| ITU G.992.5 | ADSL2+ | 24 Mbit/s | 1.0 Mbit/s |
| ITU G.992.5 Annex L[1] | RE-ADSL2+ | 24 Mbit/s | 1.0 Mbit/s |
| ITU G.992.5 Annex M | ADSL2+M | 24 Mbit/s | 3.5 Mbit/s |
| ITU G.993.1 | VDSL | | |
| ITU G.993.2 | VDSL 2 | | |
| IEEE 802.16e | WiMax | | |
| IEEE 802.20 | Mobile Broadband Wireless Access | 1 Mbit/s | 1 Mbit/s |

Figure 1:
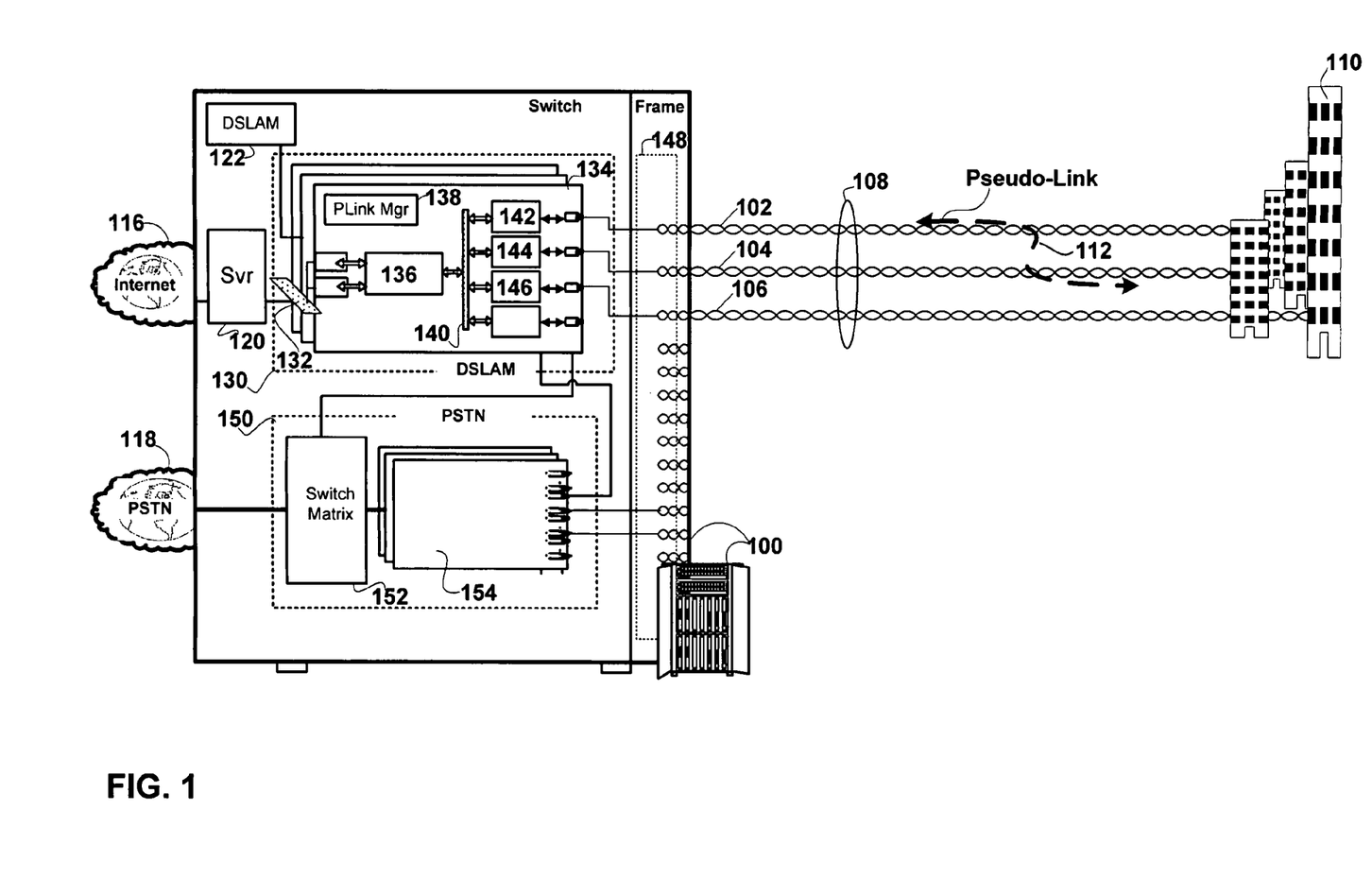
FIG. 1 is a system diagram of a multi-tone communication system in which individual subscribers are coupled via high speed communication links over public service telephone network (PSTN) subscriber lines with residential and business customers.

FIG. 1 is a system diagram of a multi-tone communication system in which individual subscribers are coupled via high speed communication links over a bundle of public service telephone network (PSTN) twisted copper subscriber lines with residential and business customers. The data communication may be modulated using various X-DSL protocols including G.Lite, ADSL and VDSL. Central Office (CO) 100 is coupled to multiple residential and business subscribers 110 via a bundle 108 of subscriber lines 102, 104, 106 for example. Each of the CO subscriber connections 102-106 terminates in the frame room 148 of the CO. From this room connections are made for each subscriber line via splitters and hybrids to both a Digital Subscriber Line Access Module (DSLAM) controller 122 and to the voice band racks 150. The splitter shunts voice band communications to dedicated line cards, e.g. line card 154 or to a voice band modem pool (not shown). The splitter shunts higher frequency X-DSL communications on the subscriber line to a selected line card 134 within DSLAM 130. The line cards of the current invention are universal, meaning they can handle any current or evolving standard of X-DSL and may be upgraded on the fly to handle new standards.

Voice band call set up between subscribers on the public switched telephone network (PSTN) 118 is controlled by a Telco switch matrix 152 implementing a switching protocol such as the common channel signaling system 7 (SS7) for setting up and tearing down a connection via an associated one of the voice band line cards, e.g. line card 154. This makes point-to-point connections to other subscribers for voice band communications. The X-DSL communications may be processed by a universal line card such as line card 134. That line card includes a plurality of AFE's e.g. 142-146 each capable of supporting a plurality of subscriber lines. The AFEs may be coupled directly or as in this embodiment of the invention via a packet based bus 140 to a DSP 136 which is also capable of multi-protocol support for all subscriber lines to which the AFE's are coupled. The line card may include more than one DSP.

Pseudo link management for the subscriber lines to which each line card is coupled is, in an embodiment of the invention, handled by a pseudo link management module 138, on each line card. Crosstalk between bundled subscriber lines can result in a pseudo link between otherwise unconnected transceiver pairs. In the example shown a pseudo link 112, is shown between the CO transceiver associated with AFE 142 and the subscriber line 102 to which it is coupled and a subscriber coupled to the remote end of subscriber line 104. This pseudo link may result in the establishment of a session between a remote subscriber and a transceiver on the CO to which the subscriber has no physical connection. The only connection is the rather tenuous one facilitated by the inductive coupling and the resultant crosstalk between adjacent subscriber lines, e.g. 102 & 104, in the bundle. The pseudo link not only grossly attenuates data rates associated with the subscriber's 'pseudo' session, but also prevents the proper session, e.g. between the CO transceiver to which the subscriber is physically coupled, e.g. via subscriber line 104, from taking place. This latter problem results from the fact that the subscriber initiates a session. The subscriber will not send an acknowledge request signal (ACKREQ) to the CO to initiate a session if it is in the training or showtime phase of a 'pseudo' session. The pseudo link management module handles this problem by detecting and disrupting a pseudo session, thereby allowing a normal session to be initiated.

Figure 2A:
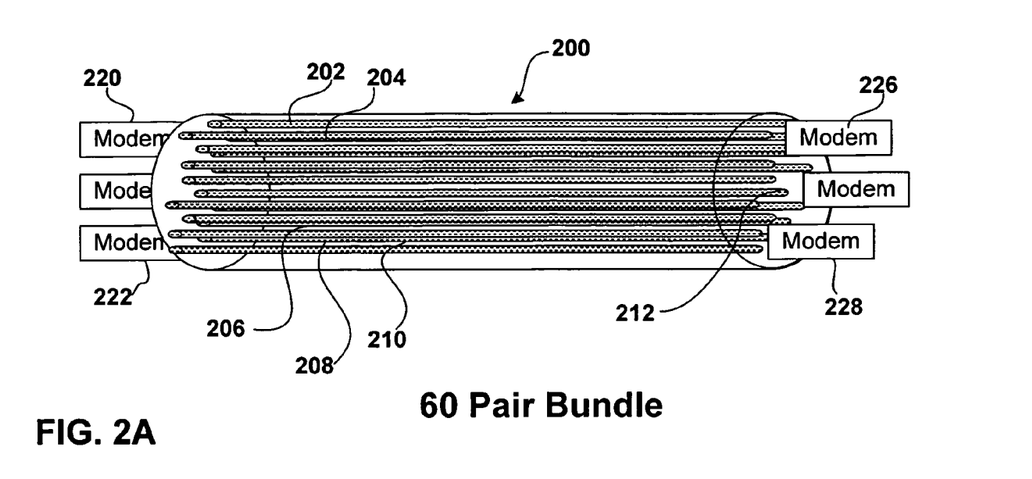
FIG. 2A is a hardware block diagram of an opposing sets of transceiver s coupled to one another by corresponding subscriber lines within a bundle.

Each line card is coupled to a back-plane bus 132 which may in an embodiment of the invention be capable of offloading and transporting low latency X-DSL traffic between other DSPs for load balancing. Communications between AFE's and DSP(s) are in an embodiment of the invention packet based which allows a distributed architecture such as will be set forth in the following FIG. 2 to be implemented. Each of the DSLAM line cards operates as a multi-tone transceiver under the control of a DSLAM controller 122 which handles global provisioning, e.g. allocation of subscriber lines to AFE and DSP resources. Once an X-DSL connection is established between the subscriber and a selected one of the DSLAM sub modules, e.g. AFE and DSP, the subscriber will be able to access any network, e.g. the Internet 116, to which the DSLAM is connected via server 120.

FIG. 2A is a hardware block diagram of an opposing sets of transceivers coupled to one another by corresponding subscriber lines within a bundle 200. Within one of the opposing sets, transceivers 220-222 are referenced. Within another of the opposing sets transceivers 226,228 are referenced. Within the bundle which may include 60 or more subscriber lines, lines 202-212 are referenced.

Figure 2B:
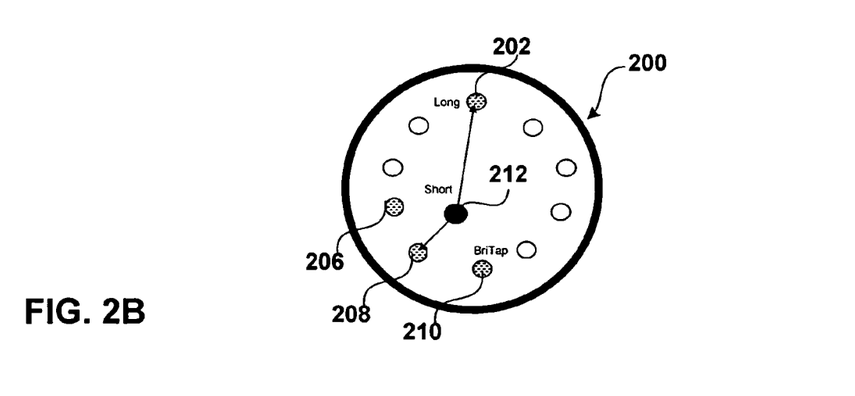
FIG. 2B is a cross-sectional view of the subscriber lines in the bundle shown in FIG. 2A.

FIG. 2B is a cross-sectional view of the subscriber lines in the bundle shown in FIG. 2A. Subscriber lines 202-212 are referenced. Any digital communication experiences signal interference, and communication protocols which support multiple sub-channels such as DMT are no exception. Interference can affect both the amplitude and the phase of the sub-channels. Such noise can arise across the time and/or frequency domains. Each of the subscriber lines in a bundle shields or interferes with other lines in the bundle in varying amounts across the time and/or frequency domains. In prior art systems this aggregate behavior is crudely addressed by the requirement of a corresponding fixed PSD mask on any of the subscriber lines which implement multi-tone modulation. All subscriber lines blast out sub-carrier signals at levels up to but not in excess of the corresponding PSD mask regardless of the bit-loading on even the presence of any actual data modulated on any particular carrier. Where the lines are short and crosstalk interference is large, a pseudo link can be established between a requesting subscriber, e.g. via an ACKREQ, and a responding CO transceiver across this crosstalk link. The crosstalk, and the inductive coupling it represents, enables the communication required to establish a session. The pseudo link management module handles this problem by detecting and disrupting a pseudo session, thereby allowing a normal session between physically coupled CO and remote transceivers to be initiated.

Figure 3:
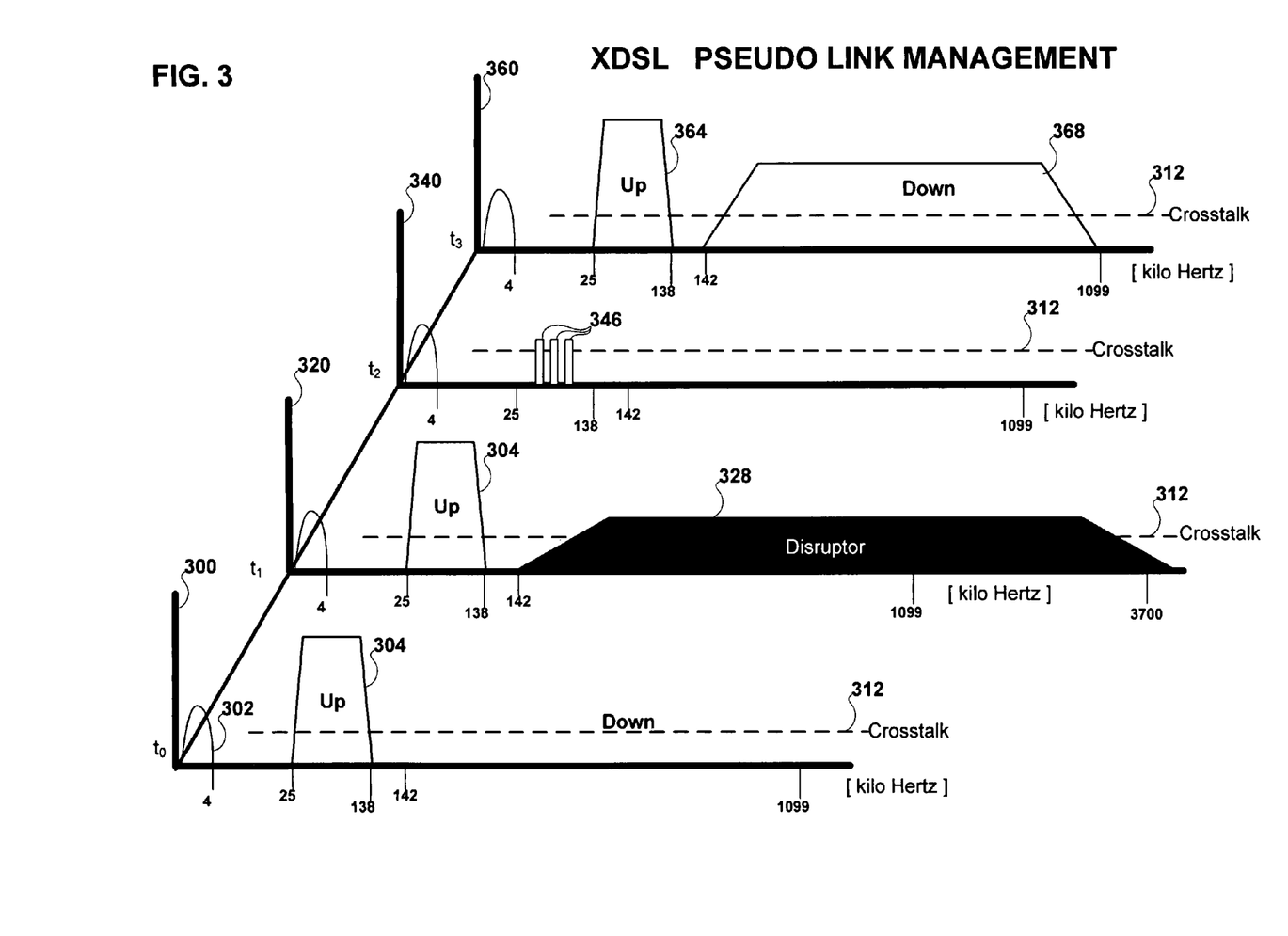
FIG. 3 is a graph with three axis showing the spectral profile of a multi-tone modulation protocol on a representative one of the subscriber lines over a time interval in which XDSL pseudo link management takes place.

FIG. 3 is a graph with three axis showing the spectral profile of a multi-tone modulation protocol on a representative one of the subscriber lines over a time interval $t_0$-$t_3$, in which XDSL pseudo link management takes place. Four sub-graphs, 300, 320, 340, 360 of frequency vs. power are shown at associated times $t_0$, $t_1$, $t_2$, and $t_3$, respectively.

At $t_0$ the pseudo link management module of a selected CO transceiver begins listening to the subscriber line to which it is coupled. Sub-graph 300 shows the signal activity on a selected subscriber line, e.g. subscriber line 104 at time $t_0$. At this point in time, no session is established by the CO transceiver, rather the CO transceiver is listening for an ACKREQ indicating the remote modem to which it is coupled wants to establish a session. What the pseudo link management module of the CO transceiver detects instead is shown in sub-graph 300. Specifically a low frequency PSTN signal 302, a communication signal 304 and crosstalk 312 are shown. The PSTN signal 302 spans a frequency from 0-4 kHz. The communication signal 304 spans a frequency from 25 kHz to 138 kHz associated with an upstream signal spectrum for various XDSL protocols. The power level of the upstream signal 304 corresponds to that associated with various XDSL standards and is significantly above that of the crosstalk 312 power level. This indicates that the remote modem is engaged in a pseudo-session.

The response of the pseudo link management module is shown in the sub-graph 320 at time $t_1$. Specifically, the pseudo link management module injects a disrupter signal 328 onto the subscriber line it is monitoring, e.g. subscriber line 104. The disruptor signal has a power level just above the level of the crosstalk 312 and below the power level associated with a downstream communication signal proscribed by any of the XDSL standards.

The result of the disruption is shown in sub-graph 340 at time $t_2$. At time $t_2$ the disruptor signal has ceased. The disrupter signal has disrupted the remote transceiver's pseudo session causing the remote transceiver or modem to terminate its pseudo session with a CO transceiver to which it is not physically coupled. The remote transceiver sends an ACK-REQ signal 346 requesting a new session with the CO transceiver to which it is physically coupled. The location and spacing of the one or more sets of tones which carry the ACKREQ signal varies by XDSL standard. In the example shown the tones dedicated to the ACKREQ signal are tones with indexes, 9, 17, and 25. Additional tones may also be utilized for transport of the ACKREQ signal, e.g. tones with indexes 944, 972, 999.

Sub-graph 360 shows the spectrum of the selected subscriber line at time $t_3$ after a new session between the physically coupled selected CO transceiver and remote transceiver is established. The spectral profile of upstream 364 and downstream 368 communication signal corresponds in the example shown to an ADSL communication profile.

Figure 4:
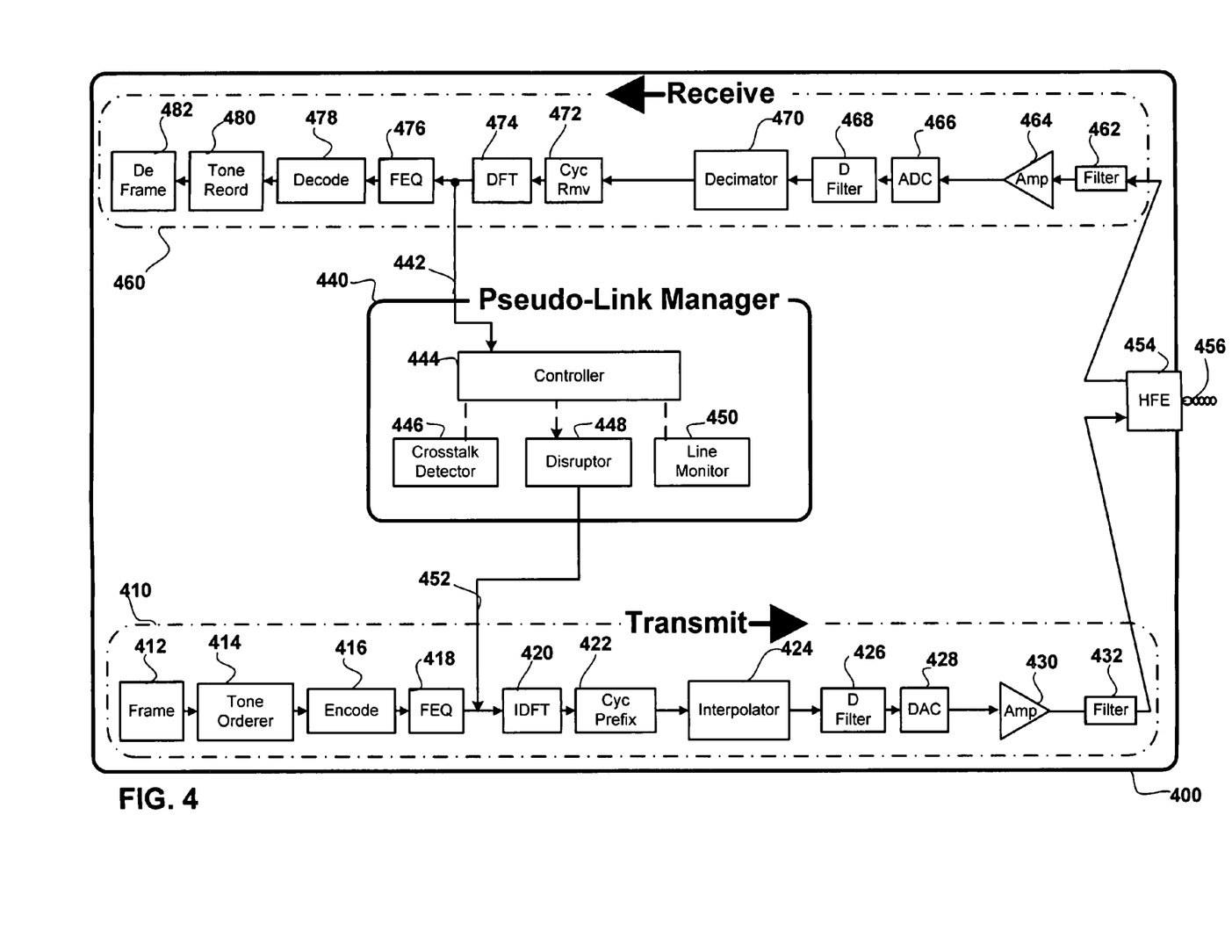
FIG. 4 is a hardware block diagram showing an embodiment of a transceiver of the current invention mounted on a line card in the central office shown in FIG. 1.

FIG. 4 is a hardware block diagram showing an XDSL transceiver 400 incorporating components for pseudo link management. The transceiver includes a plurality of shared and or discrete components coupled to one another to form a transmit path 410, a receive path 460, a local pseudo link management module 440 and a hybrid front end (HFE) 454 which couples the transmit and receive paths of the transceiver to subscriber line 456.

The receive path 460 in this embodiment of the invention includes: analog filter 462, line amplifier 464, analog-to-digital converter (ADC) 466, digital filter 468, decimator 470, cyclic prefix remover 472, discrete Fourier transform engine (DFT) 474, frequency domain equalizer 476, decoder 478, tone re-orderer 480 and deframer 482. In operation received data of each communication channel is subject to analog filtration and amplification. The received data is then digitized in the ADC followed by digital filtration, if any. Next received data is subject to any required decimation in the decimator. Next the cyclic prefix or suffix of each data symbol is removed. Each symbol of data is then transformed from the time to the frequency domain in the DFT and subject to equalization in the frequency domain. Each symbol of data is then decoded in decoder and serialized in the tone re-orderer. The demodulated data is then de-framed in the de-framer and transferred to the ATM, Ethernet or other network to which the transceiver is coupled.

The transmit path 410 includes: framer 412, tone orderer 414, encoder 416, frequency domain equalizer 418, inverse discrete Fourier transform engine (IDFT) 420, cyclic prefix wrapper 422, interpolator 424, digital filter 426, digital-to-analog converter (DAC) 428, line driver 430 and filter 432. In operation transmitted data of each communication channel is framed in the framer, loaded bit by bit into corresponding tone bins by the tone-orderer, converted to a complex number representation of the corresponding point in the symbol constellation and subject to frequency domain equalization. Then each set of resultant tones, a.k.a. a symbol, is transformed from the frequency domain to the time domain in the IDFT. Subsequently any required cyclic suffix or prefix is added and the resultant data in the time domain is subject to interpolation in interpolator. After filtering in the digital filter the interpolated data is passed to the DAC. The DAC converts the digitized data of each communication channel to corresponding analog signals. These analog signals are amplified by the line driver. The amplified output of the line driver is passed to analog filter and then via HFE 454 to subscriber line 456.

In an embodiment of the invention the transceiver also includes a local pseudo link management module 440. This module handles the detection and disruption of pseudo links the presence of which indicates a pseudo session between a local and a remote transceiver which are not physically coupled to one another via a subscriber line.

The local pseudo link management module 440 includes: a controller 444, a crosstalk detector 446, a disrupter 448 and a line monitor 450. The local pseudo link management module monitors received communications via connection 442 to the receive path and injects any required disruptor signal into the transmit path via connection 452. In operation the pseudo link management module and specifically the controller thereof is responsive to activation of the transceiver generally or specifically to activation by the DSLAM controller 122 (See FIG. 1). The operation of the pseudo link management module takes place before the training phase of operation of the associated transceiver and assures that the remote modem does not enter into a pseudo-session, or if it does, that the pseudo-session is disrupted.

On activation the local pseudo link management module enables monitoring of the subscriber line 456 via line monitor 450, and measurement of crosstalk levels on the subscriber line via crosstalk detector 446. The line monitor is listens to the associated subscriber line 456 for any indication of a pseudo-link and the associated pseudo-session. If a communication signal is detected, e.g. upstream communication signal 304 (See FIG. 3) then the disrupter 448 is activated for a specified time interval, after which the pseudo-session is aborted by the remote transceiver. Any subsequent ACKREQ signal is received and acknowledged by the correct transceiver, e.g. the CO transceiver 400 to which the remote transceiver is physically coupled over subscriber line 456. Subsequently a normal session is established, free of any pseudo link, and between physically connected transceivers.

The hardware blocks shown in this and the following figures may be alternately implemented in software or firmware. The transmit and receive path described above and the scalable components thereof may be applied with equal advantage in embodiments of the invention where a plurality of XDSL channels are multiplexed on the transmit and receive path of the transceiver. The transmit and receive path components may be coupled to one another either by packet based transfer of successive packetized portions of a communication channel or by dedicated point-to-point coupling between components. In still another embodiment of the invention the pseudo link management processes may be implemented on card in pseudo link management unit, 138 (See FIG. 1).

The components shown in FIG. 4 collectively comprise a physical transceiver. In alternate embodiments of the invention the functions performed by the components may be implemented on a logical transceiver implemented on a combined digital signal processor (DSP) and analog front end (AFE) such as that shown on the line card 134 in FIG. 1.

Figure 5:
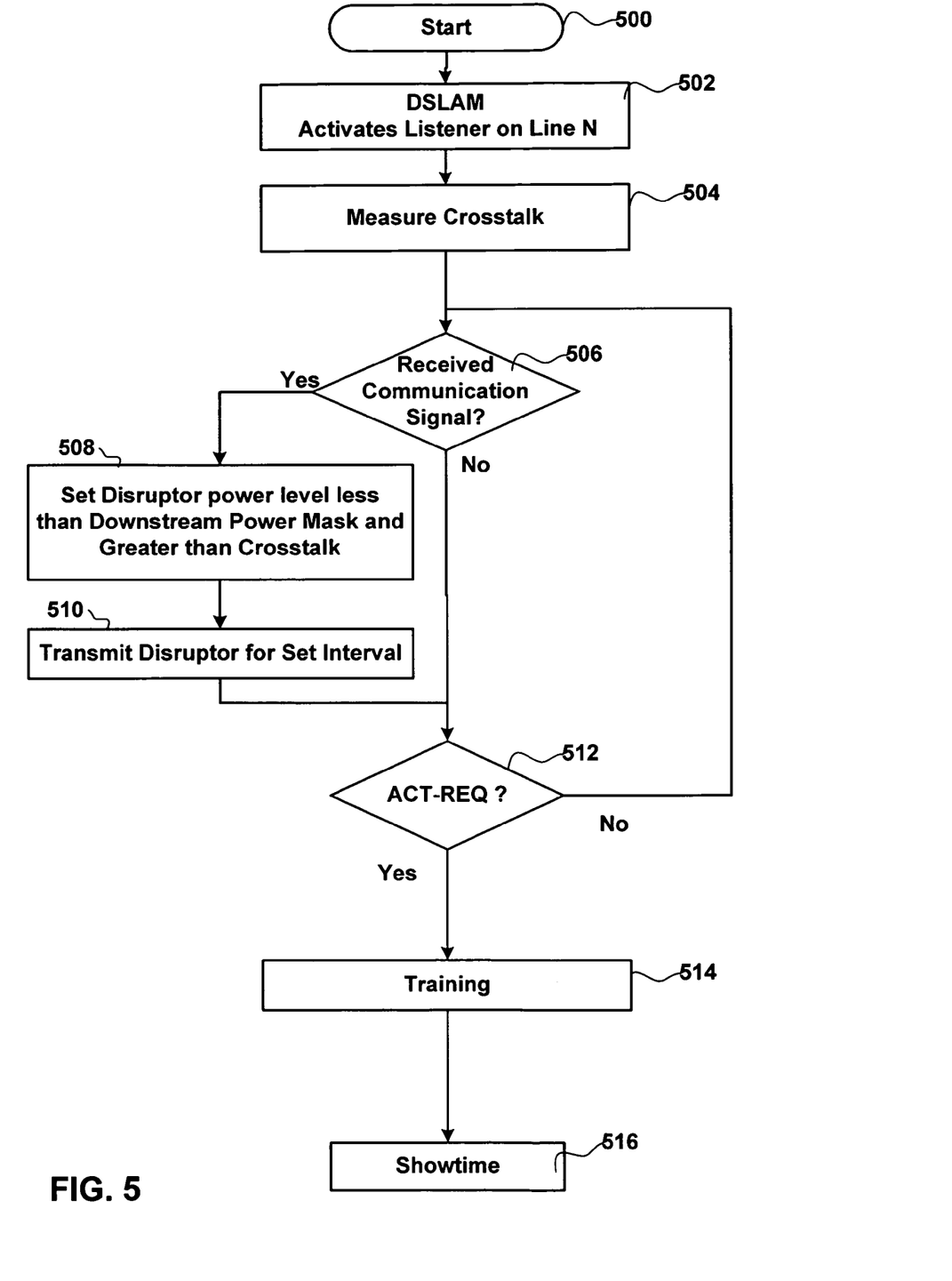
FIG. 5 is a process flow diagram of an embodiment of the processes associated with XDSL pseudo link management.

FIG. 5 is a process flow diagram of an embodiment of the processes associated with XDSL pseudo link management. After startup 500 control passes to process 502. In process 502 DSLAM or transceiver activation of the pseudo link manager results in monitoring of a selected subscriber line for a pseudo link. In process 504 crosstalk on the selected subscriber line is also measured. Next in decision process 506 a determination is made as to whether a communication signal indicative of a pseudo session exists on the selected subscriber line. If it does not then control passes to decision process 512. If it does control passes to processes 508 and 510 for disrupting the pseudo link. In process 508 the power level of a disruptor signal is set at a level just above the level of the measured crosstalk and well below the power level associated with a downstream power mask of any of the XSL standards. Next in process 510 the disrupter signal is injected into the transceiver's transmit path for a set interval. Next in decision process 512 a determination is made as to whether the remote transceiver is sending an ACTREQ signal requesting a normal session. If not control returns to decision process 506. If however an ACTREQ signal is received control passes to process 514 in which the training phase of operation is commenced. Once training is complete the physically coupled CO and remote transceivers enter the showtime phase 514 of a new session.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A transceiver having shared and discrete components forming a transmit path and a receive path configured to couple to a subscriber line among a bundle of subscriber lines for establishing a multi-tone modulated frequency division multiplexed communication channel with a remote transceiver coupled to an opposing end of the subscriber line, and the transceiver comprising:

a pseudo link manager coupled between the transmit and receive path components to manage pseudo links on the subscriber line by detecting a pseudo-session between the remote transceiver and an other transceiver resulting from crosstalk between the subscriber line and an other subscriber line in the bundle coupled to the other transceiver and by disrupting the pseudo-session thereby enabling a normal session between the remote transceiver and the transceiver over the subscriber line and wherein the pseudo link manager further comprises:

a line monitor to monitor the subscriber line prior to initiating a session for a received communication signal from the remote transceiver indicative of the pseudo-session between the remote transceiver and the other transceiver; and a disruptor responsive to a detection by the line monitor of such communication signal to transmit a disruptor signal over the subscriber line to the remote transceiver at a power level less than a downstream power mask and greater than a crosstalk level on the subscriber line, thereby disrupting the pseudo-session and allowing the remote transceiver to initiate a normal session with the transceiver over the subscriber line.

2. The transceiver of claim 1, wherein the line monitor and the disruptor further comprises:

the line monitor to monitor the subscriber line prior to initiating a session for a received communication signal from the remote transceiver which spans a frequency range associated with an upstream signal of a multi-tone modulated frequency division multiplexed digital subscriber line protocol, such upstream signal indicative of a pseudo-session between the remote transceiver and the other transceiver; and the disruptor responsive to a detection by the line monitor of such upstream signal to transmit a disruptor signal over the subscriber line which disrupts the pseudo-session, thereby allowing the remote transceiver to initiate a normal session with the transceiver over the subscriber line.

3. A communication system comprising a plurality of transceivers each coupled to a corresponding subscriber line within a bundle of subscriber lines and a one of the plurality of transceivers coupled to a subscriber line within the bundle for establishing a multi-tone modulated frequency division multiplexed communication channel with a remote transceiver coupled to an opposing end of the subscriber line, and the communication system comprising:

a pseudo link manager to manage pseudo links on the subscriber line by detecting a pseudo-session between the remote transceiver and an other one of the plurality of transceivers resulting from crosstalk between the subscriber line and an other subscriber line in the bundle coupled to the other one of the plurality of transceivers and by disrupting the pseudo-session thereby enabling a normal session between the remote transceiver and the one of the plurality of transceivers over the subscriber line and wherein the pseudo link manager further comprises:

a line monitor to monitor the subscriber line prior to initiating a session for a received communication signal from the remote transceiver indicative of a pseudo-session between the remote transceiver and the other one of the plurality of transceivers; and a disruptor responsive to a detection by the line monitor of such communication signal to transmit a disruptor signal over the subscriber line to the remote transceiver at a power level less than a downstream power mask and greater than a crosstalk level on the subscriber line, thereby disrupting the pseudo-session and allowing the remote transceiver to initiate a normal session with the one of the plurality of transceivers over the subscriber line.

4. The communication system of claim 3, wherein the line monitor and the disruptor further comprises:

the line monitor to monitor the subscriber line prior to initiating a session for a received communication signal from the remote transceiver which spans a frequency range associated with an upstream signal of a multi-tone modulated frequency division multiplexed digital subscriber line protocol, such upstream signal indicative of a pseudo-session between the remote transceiver and the other one of the plurality of transceivers; and the disruptor responsive to a detection by the line monitor of such upstream signal to transmit a disruptor signal over the subscriber line which disrupts the pseudo-session, thereby allowing the remote transceiver to initiate a normal session with the one of the plurality of transceivers over the subscriber line.

5. A method for operating a transceiver having shared and discrete components forming a transmit path and a receive path configured to couple to a subscriber line among a bundle of subscriber lines for establishing a multi-tone modulated frequency division multiplexed communication channel with a remote transceiver coupled to an opposing end of the subscriber line, and the method comprising:

monitoring the subscriber line for a received communication signal indicative of a pseudo-session between the remote transceiver and an other transceiver resulting from crosstalk between the subscriber line and an other subscriber line in the bundle coupled to the other transceiver;

transmitting a disruptor signal over the subscriber line to the remote transceiver at a power level less than a downstream power mask and greater than a crosstalk level on the subscriber line responsive to a detection of the received communication signal in the monitoring act; thereby disrupting the remote transmitter's pseudo-session; and initiating a new session including upstream and downstream communication channels between the transceiver and the remote transceiver over the subscriber line.

6. The method of claim 5, wherein the communication signal monitored in the monitoring act spans a frequency range associated with the upstream communication channel.

7. A method for operating a communication system comprising a plurality of transceivers each coupled to a corresponding subscriber line within a bundle of subscriber lines and a one of the plurality of transceivers coupled to a subscriber lines within the bundle for establishing a multi-tone modulated frequency division multiplexed communication channel with a remote transceiver coupled to an opposing end of the subscriber line, and the method comprising:

monitoring the subscriber line for a received communication signal indicative of a pseudo-session between the remote transceiver and an other one of the plurality of transceivers resulting from crosstalk between the subscriber line and an other subscriber line in the bundle coupled to the other one of the plurality of transceivers;

transmitting a disruptor signal over the subscriber line to the remote transceiver at a power level less than a downstream power mask and greater than a crosstalk level on the subscriber line responsive to the detection of the received communication signal in the monitoring act; thereby disrupting the remote transceiver's pseudo-session; and initiating a new session including upstream and downstream communication channels between the remote transceiver and the one of the plurality of transceivers over the subscriber line.

8. The method of claim 7, wherein the communication signal monitored in the monitoring act spans a frequency range associated with the upstream communication channel.

9. A means for operating a transceiver having shared and discrete components forming a transmit path and a receive path configured to couple to a subscriber line among a bundle of subscriber lines for establishing a multi-tone modulated frequency division multiplexed communication channel with a remote transceiver coupled to an opposing end of the subscriber line, and the means comprising:

means for monitoring the subscriber line for a received communication signal indicative of a pseudo-session between the remote transceiver and an other transceiver resulting from crosstalk between the subscriber line and an other subscriber line in the bundle coupled to the other transceiver;

means for transmitting a disruptor signal over the subscriber line to the remote transceiver at a power level less than a downstream power mask and greater than a crosstalk level on the subscriber line responsive to a detection of the received communication signal by the means for monitoring; thereby disrupting the remote transceiver's pseudo-session; and means for initiating a new session including upstream and downstream communication channels between the remote transceiver and the transceiver over the subscriber line.

10. The means of claim 9, wherein the communication signal monitored by the monitoring means spans a frequency range associated with the upstream communication channel.

11. A means for operating a communication system comprising a plurality of transceivers each coupled to a corresponding subscriber line within a bundle of subscriber lines and a one of the plurality of transceivers coupled to a subscriber line within the bundle for establishing a multi-tone modulated frequency division multiplexed communication channel with a remote transceiver coupled to an opposing end of the subscriber line, and the means comprising:

means for monitoring the subscriber lines for a received communication signal indicative of a pseudo-session between the remote transceiver and an other one of the plurality of transceivers resulting from crosstalk between the subscriber line and an other subscriber line in the bundle coupled to the other one of the plurality of transceivers;

means for transmitting a disruptor signal over the subscriber line to the remote transceiver at a power level less than a downstream power mask and greater than a crosstalk level on the subscriber line responsive to the detection of the received communication signal by the means for monitoring; thereby disrupting the remote transceiver's pseudo-session; and means for initiating a new session including upstream and downstream communication channels between the remote transceiver and the one of the plurality of transceivers.

12. The means of claim 11, wherein the communication signal monitored by the monitoring means spans a frequency range associated with the upstream communication channel.

\* \* \* \* \*